US010785350B2

United States Patent
Barszczak et al.

(10) Patent No.: US 10,785,350 B2
(45) Date of Patent: Sep. 22, 2020

(54) HEARTBEAT IN FAILOVER CLUSTER

(71) Applicant: HEWLETT PACKARD ENTERPRISE DEVELOPMENT LP, Houston, TX (US)

(72) Inventors: Tomasz Barszczak, San Jose, CA (US); Sudhanshu Rajvaidya, San Jose, CA (US); Rajeev Verma, San Jose, CA (US); Weiwei Huo, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 173 days.

(21) Appl. No.: 16/153,801

(22) Filed: Oct. 7, 2018

(65) Prior Publication Data
US 2020/0112628 A1  Apr. 9, 2020

(51) Int. Cl.
G06F 11/00 (2006.01)
H04L 29/14 (2006.01)
(Continued)

(52) U.S. Cl.
CPC .......... H04L 69/40 (2013.01); G06F 11/1687 (2013.01); G06F 11/3055 (2013.01);
(Continued)

(58) Field of Classification Search
CPC ....... H04L 69/40; H04L 43/10; H04L 43/103; H04L 67/1097; H04L 67/145;
(Continued)

(56) References Cited

U.S. PATENT DOCUMENTS 7,856,480 B2  12/2010  Muchow
7,917,613 B2 *  3/2011  Letca ...................... H04L 43/10
                                                      709/223
(Continued)

FOREIGN PATENT DOCUMENTS

CN  103051470 A  *  4/2013
WO  WO-2017133233 A1  *  8/2017  ............. G06F 16/27

OTHER PUBLICATIONS

Microsoft, "WSFC Quorum Modes and Voting Configuration (SQL Server)," Oct. 3, 2016, 6 pages, https://docs.microsoft.com/en/us/sql/sql/server/failover-clusters/windows/wsfc/quorum-modes-and-voting-configuration-sql-server?view=sql-server-2017#ClusterHealthDetectionbyQuorum.

Primary Examiner — Anthony J Amoroso
(74) Attorney, Agent, or Firm — Nolte Intellectual Property Law Group

(57) ABSTRACT

This disclosure is directed to heartbeat messages for a high-availability redundant distributed computing environment (e.g., a quorum data storage implementation). Heartbeat messages may be sent from a node to other members of a duster as an indication of hardware state, network connectivity, and possibly application status on the sending node. If a member of a cluster (or quorum) goes silent (e.g., misses heartbeats), other members of the duster (or quorum) may consider that member (or the node that hosts that member) to be non-functional and may initiate a recovery action. Techniques are disclosed for using low-latency non-persistent storage for some heartbeat messages (referred to herein as a "non-persistent heartbeat messages") to replace a portion of typical persistent (e.g., disk-based) heartbeat messages to reduce overall processing for periodic heartbeat messages. Further, implementations that aggregate multiple
(Continued)

heartbeat messages from a node into a fewer number of heartbeat messages are disclosed.

20 Claims, 9 Drawing Sheets

(51) Int. Cl.
 *H04L 29/06* (2006.01)
 *H04L 29/08* (2006.01)
 *H04L 12/26* (2006.01)
 *G06F 11/16* (2006.01)
 *G06F 11/30* (2006.01)
(52) U.S. Cl.
 CPC .......... *H04L 43/10* (2013.01); *H04L 67/1097* (2013.01); *H04L 69/163* (2013.01)
(58) Field of Classification Search
 CPC ... H04L 69/163; H04L 41/06; H04L 41/0654; H04L 41/0813; H04L 41/0816; H04L 29/08612; G06F 11/0703; G06F 11/0706; G06F 11/0709; G06F 11/0727; G06F 11/0751; G06F 11/0754; G06F 11/0757; G06F 11/076; G06F 11/14; G06F 11/1402; G06F 11/1415; G06F 11/142; G06F 11/16; G06F 11/1608; G06F 11/1666; G06F 11/1675; G06F 11/1687; G06F 11/2023; G06F 11/2033; G06F 11/2048; G06F 11/3051; G06F 11/3055
 See application file for complete search history.

(56) References Cited

U.S. PATENT DOCUMENTS

| | | | |
|---|---|---|---|
| 8,560,747 B1 | 10/2013 | Tan et al. | |
| 8,874,974 B2 * | 10/2014 | Griffith | .................. G06F 11/20 714/4.11 |
| 10,560,360 B2 * | 2/2020 | Griffith | ............... H04L 43/0823 |
| 2016/0080239 A1 * | 3/2016 | Buenrostro | ......... H04L 43/0811 709/224 |
| 2016/0117213 A1 * | 4/2016 | Arjun | .................. G06F 11/0709 714/55 |
| 2017/0262519 A1 | 9/2017 | Horowitz et al. | |
| 2018/0004590 A1 * | 1/2018 | Johnson | .............. G06F 11/0709 |
| 2019/0235939 A1 * | 8/2019 | Warrum | .............. G06F 11/2005 |

* cited by examiner

HEARTBEAT IN FAILOVER CLUSTER

BACKGROUND

In the field of network computing, multiple computers or systems (individually referred to as nodes of a network) may be designed to work as a group to provide functionality and redundancy for a distributed network application or environment. A distributed network environment generally refers to an environment where multiple computers share information amongst each other through a network communication mechanism. Typical network communication mechanisms include transport control protocol (TCP) Internet protocol (IP) networks, and session initiation protocol (SIP) networks. Other transport protocols also exist. In general, transport protocols define a standard for how different systems communicate with each other over the physical (e.g., wired networks or wireless transport) layer of the network.

Other communication protocols (e.g., hypertext transport protocol (HTTP), file transport protocol (FTP), etc.) also exist at an application layer, to define how client applications and server applications communicate with each other. This application layer is generally a layer above the physical communication transport layer in accordance with the open systems interconnect (OSI) network model. By "connecting" different computer systems together those computer systems (and applications executing on them) may work together to execute different functional components of a distributed network application (e.g., distributed application). That is, in a distributed application, different computer systems may provide different types of functionality for the overall application or may serve as redundant components for a given functional component.

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not require serial processing and therefore may be performed in an order different than shown or possibly in parallel with each other. For a detailed description of various examples, reference will now be made to the accompanying drawings, in which.

DETAILED DESCRIPTION

Figure 1:
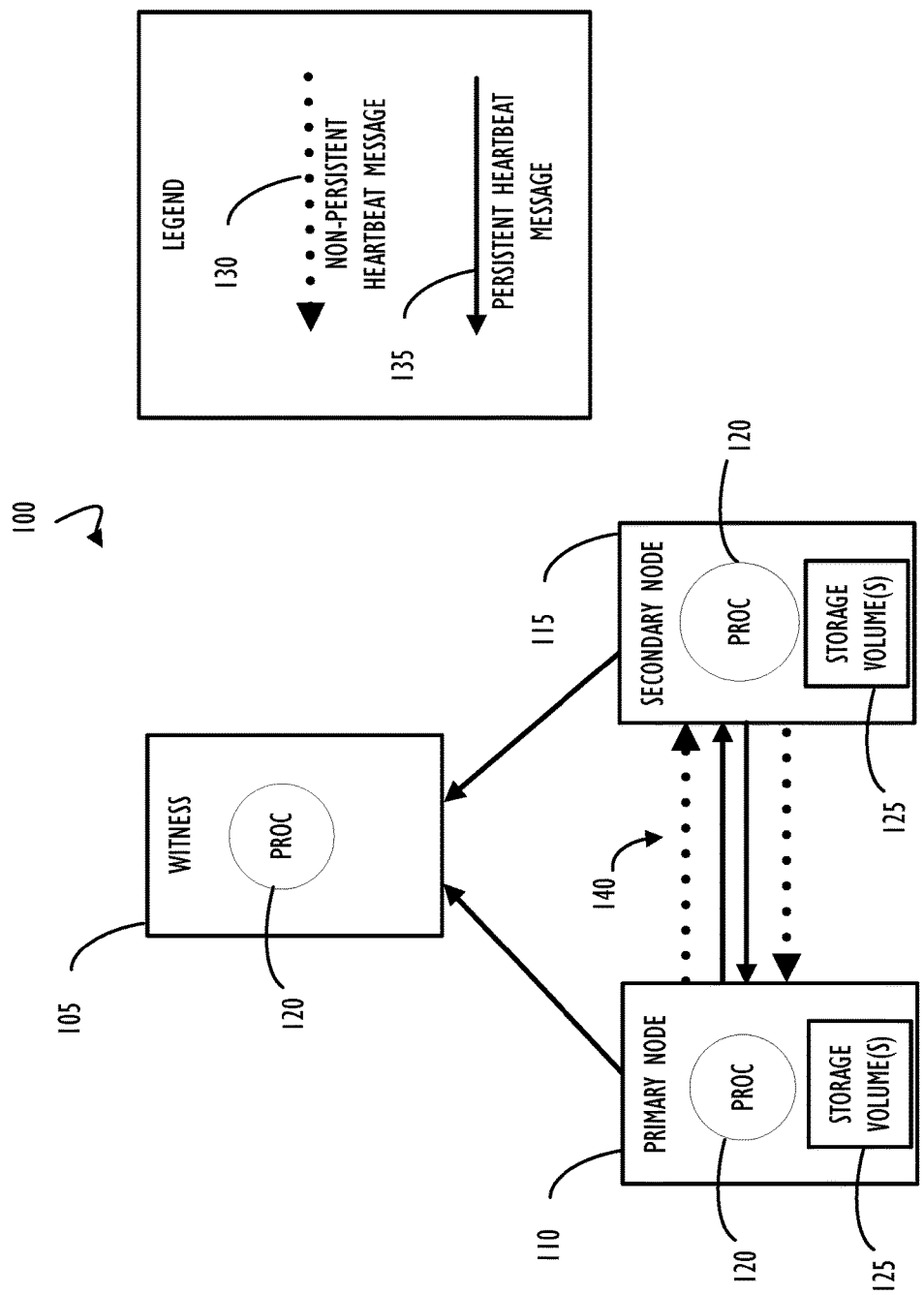
FIG. 1 is a functional block diagram representation of a network including two nodes supporting a single quorum datastore providing redundancy for data storage and a single witness for the quorum, according to one or more disclosed examples.

Examples of the subject matter claimed below will now be disclosed. In the interest of clarity, not all features of an actual implementation are described in this specification. It will be appreciated that in the development of any such actual example, numerous implementation-specific decisions may be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

There are many different mechanisms to allow different functional components of a distributed network application to communicate, coordinate, and share workload. One such mechanism to assist in coordination is a quorum heartbeat message. A quorum heartbeat message, in this context, provides information to other members of the quorum about the state (or status) of a quorum member initiating the heartbeat message. Techniques for performing quorum heartbeats with improved efficiency by a) alternating between transmission of two different types of messages (e.g., persistent heartbeat messages and non-persistent heartbeat messages), b) alternating how a heartbeat message will be processed at a node receiving the heartbeat message (e.g., as a persistent heartbeat message or a non-persistent heartbeat message), or c) a combination of altering transmission and altering processing will be explained in the examples of this disclosure.

In a first example implementation, there may be two different types of heartbeat messages provided by a sending entity such that some of the heartbeat messages may be formatted and transmitted in such a way as to indicate that the heartbeat message is intended to be a persistent heartbeat message and other heartbeat messages may be formatted and transmitted with the intent to be a non-persistent heartbeat message. That is, there may be two different types/formats of heartbeat messages initiated from a sender. Of course, even though the sender may determine to send two different types of messages, it may not be required, that the receiver honor that intention. Thus, even in implementations where a sender sends two different types of heartbeat messages, a receiver may be configured to override that intention and make its own determination as to how to process each individual heartbeat message. In a first example implementation, the sender of the heartbeat message will determine to send non-persistent heartbeat messages at a higher frequency than persistent heartbeat messages and the receiver will honor those messages as indicated. Thus, a performance improvement on the receiving node (e.g., reduced processing time for received heartbeat messages) may be realized, in part, because of the actions of the node sending each heartbeat message (e.g., of different types).

In a second example implementation, there may or may not be different types of heartbeat messages. In this second example, a node receiving and processing individual instances of periodic heartbeat messages may make a determination as to which of the instances to treat as persistent and to treat all others as non-persistent. Thus, a receiving node may determine to select a subset of all heartbeat messages (typically a small percentage) to treat as persistent. Thus, a performance improvement on the receiving node may be realized based, in part, on improved efficiency of processing heartbeat messages. Specifically, the larger percentage of non-persistent heartbeat messages may reduce what would have been processing time on the receiving node if all heartbeat messages had been processed as persistent. Balancing the percentage to treat as persistent versus non-persistent may represent a design decision based on reliability considerations and performance considerations. In general, persistent heartbeat messages represent a more reliable message because they are stored to memory that will not be lost due to system restart (or some other failure conditions) whereas non-persistent heartbeat messages (as the name implies) may more often be lost upon failure, restart, etc.

In a third example implementation, a combination of the above two examples may be configured. In this third example, the sender may provide an indication as to if the message is intended to be treated as a persistent heartbeat message or not. However, the sender of the heartbeat message may not have final authority over this decision and the receiver may make its own determination as to how to process each message. Thus, a combination of persistent and non-persistent heartbeat messages may be used to coordinate throughout the system.

As mentioned above, in some implementations, contents of a heartbeat message may not be different between persistent heartbeat messages and non-persistent heartbeat messages. In other implementations, persistent heartbeat messages may contain additional information (or possibly less information) compared to non-persistent heartbeat messages. In some implementations, a sender side may determine when to send a persistent or a non-persistent heartbeat message. In other implementations, a receiver may periodically receive heartbeat messages and determine whether to treat a particular instance of the heartbeat message as a persistent heartbeat message or a non-persistent heartbeat message. Processing of persistent heartbeat messages may have higher latency than processing non-persistent heartbeat messages, because processing a persistent heartbeat message may include saving information in the persistent heartbeat message to higher-latency, non-volatile storage (e.g., solid state drive(s) (SSD(s)), magnetic or optical disk(s), or the like), while processing a non-persistent heartbeat message may include saving to lower-latency, possibly volatile storage, like memory or cache of a computer device (e.g., storage server, quorum member, etc.).

This disclosure provides a high-availability redundant distributed computing environment that may be used by nodes (e.g., computing devices) of a quorum data storage implementation. Heartbeat messages may be sent between members of a cluster as an indication of hardware state, network connectivity, and possibly application status. If a member of a cluster (or quorum) goes silent (i.e., their heartbeat message is not received) for a period of time, other members of the cluster (or quorum) may consider that member (or the node that hosts that member) to be non-functional and may initiate a recovery action. In the case where a complete node becomes unavailable, all functionality of that node may be failed over to one or more other nodes of the cluster that remain available. Alternatively, if only an application on a node becomes unavailable, the node may continue to function for its other applications and the unavailable application may be failed over to another node in the application cluster. To be clear, there may exist both hardware clusters and application clusters executing on a portion of a hardware cluster. One example of an application cluster that will provide the examples of this disclosure is a quorum data store capability where multiple nodes of a cluster may be members of a quorum to provide data store capability, such as network attached storage, for other computer systems (possibly both inside and outside the cluster). Other quorum implementations are possible and may benefit from the techniques of this disclosure, however, for simplicity examples of this disclosure may be limited to a quorum data store implementation.

In the field of network computing, an example of redundant storage may be provided by a plurality of redundant disks. In some cases, this redundancy may be implemented by having multiple redundant disks within a single computer system. An example of multiple disks within a single computer system is often referred to as a redundant array of inexpensive disks (RAID). RAID implementations have various levels (e.g., RAID0 to RAID6) depending on the number of disks, performance, and type of redundancy desired. The details of a particular RAID implementation are beyond the scope of this disclosure. RAID servers also often have redundant power supplies, network connections, and disk controllers, such that a single failure will not cause data to be inaccessible to other systems. However, typical RAID implementations are in a single device such that a dual failure on that single device, or loss of connectivity (e.g., network communication) to that single device may cause data to be unavailable.

To extend upon the availability of RAID redundancy, multiple servers at different locations may provide an added degree of availability in that connectivity to both locations (often geographically distant from each other) must be lost prior to having a data outage. Redundant geographically distant implementations are often referred to as a primary data center and a backup or remote data center. Further, for performance and cost reasons, a primary data center may host a first portion of all data and applications in a primary role and other data and applications (e.g., a second portion) in a backup role with the other data center performing the complementary role for the first and second portion. In this manner, when both data centers are available, primary applications are split between the two data centers with every redundant application having an available backup. Upon a failure of a data center, any applications that were executing in the backup role may assume primary role and the available data center may host all applications in a primary role (e.g., for the duration of unavailability of the failed data center). Each host (e.g., computer system) within a data center may implement its own redundancy using methods similar to those discussed above (e.g., RAID, redundant components, etc.). Also, nodes of one data center may share heartbeat messages with complimentary nodes (e.g., nodes working together) in the other data center.

Data between two servers functioning as a primary and a backup to each other should be kept synchronized such that, upon failover, current data is available, as opposed to out-of-date (e.g., stale) data. One implementation to address distributed redundant storage is referred to as a quorum data store that may execute on a cluster of nodes. In normal operation, the computing devices of a quorum may exchange their roles (e.g., primary, secondary, etc.) and other coordination information (e.g., resource states) through heartbeat messages and synchronize their application start and stop procedures. In particular, in case of an application failover because of a software failure or a manual operation, the stop script which stops the application may be first executed on the primary computing device, before executing the start script on the secondary computing device. Thus, replicated data on the secondary computing device may maintain an internal consistency corresponding to a clean stop of the application. That is, data is not left in a condition of partial update with respect to database commits or application processing, for example. In a quorum data store (and the cluster supporting it) there may also be a "witness" node that does not necessarily participate in storing data but may assist in managing roles and coordinating state information of a quorum data store (e.g., host the quorum state store that is discussed further below).

In general, a quorum data store may be made up of multiple actors within a failover unit. The failover unit includes a primary and one or more backup computing device (e.g., nodes of a cluster). A computing device may be a server computer, a storage array, or another functional node of a quorum data store. Quorum actors represent the set of quorum members that have volumes (physical or logical disk storage areas) on different nodes. If a witness is implemented as an active witness, that witness may also represent a quorum actor. Alternatively, a witness may be implemented as passive and represent a quorum member (but not a quorum actor). As mentioned above, in a quorum data store implementation, one basic mechanism for synchronizing two computing devices and detecting computing device failures is the quorum heartbeat message, which represents a monitoring data flow on a network shared by a pair of computing devices. That is, each computing device in a quorum may share a heartbeat message periodically with all other members of the quorum.

To ensure availability upon node failure, quorum heartbeat messages may be persistent at each member of the quorum. For example, persistent heartbeat messages may be written to persistent storage. In examples described herein, "persistent storage" may be implemented by any type of non-volatile storage device or medium, or any combination thereof. Examples of non-volatile storage devices may include hard disk drives (HDDs), solid state drives (SSDs), or any other type of storage device that is able to retain data stored thereon when power to the device is lost. Persistent storage, such as non-volatile storage devices, may have higher latency than various forms of non-persistent storage. In examples described herein, "non-persistent storage" may be implemented by any type of volatile storage device, memory, or medium, or any combination thereof. Examples of volatile storage devices may include random access memory (RAM), dynamic random access memory (DRAM), or any other type of storage device that is not able to retain data stored thereon when power to the device is lost. This disclosure represents an improvement to the technical art of quorum data store management, in part, by providing an improved technique for using low-latency (relative to persistent storage) non-persistent storage (e.g., volatile memory) for a new type of non-persistent heartbeat message to replace some of the persistent heartbeat messages such that a frequency of persistent heartbeat messages may be reduced (e.g., may be performed at a much slower rate) and thus reduce overhead for processing of heartbeat messages overall. Further improvements to this technical field in this disclosure include implementations that aggregate multiple heartbeat messages from a node into a fewer number of heartbeat messages than prior to aggregation (optimally a single heartbeat message from a node after aggregation at that node).

As mentioned above, a quorum data store may be made up of multiple actors within a failover unit. Quorum actors represent the set of quorum members that have volumes (logical and/or physical storage areas) on different nodes and possibly a single witness. The single witness may be in passive mode or active mode (e.g., an actor). In passive mode, the witness is a quorum member but not a quorum actor (e.g., has no storage for data maintained by the quorum data store but is involved in decisions for the quorum data store).

Optimization of heartbeat messages for actors in a quorum may be implemented by using writes to non-persistent storage in place of writes to persistent storage for every heartbeat message. In some disclosed implementations, quorum actors may write heartbeat information (e.g., node coordination information mentioned above), received in heartbeat messages, to non-persistent storage at a relatively high frequency (e.g., sub-second). At a much lower frequency (e.g., after writing heartbeat information to non-persistent storage 10 times), quorum members may write heartbeat information, received in a heartbeat message, to persistent storage. Thus, in disclosed implementations, heartbeat messages may be treated as either a "non-persistent heartbeat message" for low latency storage only between actors or a "persistent heartbeat message" that is persistently stored at each quorum member.

Note that not all quorum members are necessarily quorum actors and, in some implementations, only quorum actors initiate heartbeat messages with all quorum members receiving heartbeat messages. In practice, this typically means that a quorum witness will receive but not initiate heartbeat messages. For the examples of this disclosure, all quorum members may send/receive/process either persistent heartbeat messages or non-persistent heartbeat messages for a period of time concurrent with other quorum members. That is, if any node within a single quorum data store has missed a heartbeat message, then all other nodes of that single quorum data store may only process persistent heartbeat messages for a period of time prior to any node (or all nodes) returning to a mixture of non-persistent and persistent heartbeat messages. Simply put, if an error condition is expected, quorum members may forego optimization provided by non-persistent heartbeat messages in favor of higher overhead persistent heartbeat messages until all members are successfully receiving a sufficient number of consecutive persistent heartbeat messages. In an alternate implementation, all quorum members may determine independently when to send/receive/process persistent heartbeat messages or non-persistent heartbeat messages.

Upon determination that a non-persistent heartbeat message from a quorum actor has been missed, indicating a possible failure, transmission of or processing of non-persistent heartbeat messages may be temporarily suspended in favor of persistent heartbeat messages for a period of time until a sufficient number of successfully received consecutive persistent heartbeat messages are received. For example, if only one non-persistent heartbeat message is missed and then many persistent heartbeat messages in a row are received, the issue may have been a temporary/transient issue that does not require a recovery action. Once a pre-determined sufficient number of consecutive persistent heartbeat messages are processed without error, the disclosed implementations may resume the non-persistent heartbeat messages mixed with only periodic lower frequency persistent heartbeat messages. In some implementations, a single missed heartbeat message of either type may signal that corrective action (e.g., failover) is needed.

Another optimization may also be performed by implementing node level heartbeat messages (e.g., "aggregated heartbeat messages") instead of heartbeat messages for each quorum actor (e.g., a single node may host multiple quorum actors). This node level heartbeat may represent an aggregation of the above-mentioned non-persistent heartbeats or persistent heartbeats such that if an aggregated heartbeat message is missed, and the associated node is determined to be failed, all actors on that node (more generally all software components on that node) may be declared failed (e.g., dead/unavailable). Upon detection of a node failure, multiple failover-units may concurrently undergo a failover decision to address the failed node and maintain overall system, application, and data availability for functionality provided by the duster.

Having the above understanding of heartbeat messages, and in particular quorum heartbeats as used by quorum data stores, a detailed implementation example is explained below with reference to the figures. This example implementation uses a quorum data store as an example application implementation, however, other types of systems that share a heartbeat implementation may also benefit from the techniques of this disclosure.

Referring now to FIG. 1, a functional block diagram of quorum data store 100 illustrates a representation of a network including two nodes (primary node 110 and secondary node 115) supporting single quorum datastore 100 providing redundancy for data storage and a single witness node 105 for quorum datastore 100, according to one or more disclosed implementations. In the example of FIG. 1, witness node 105 assists in providing information to the single illustrated quorum datastore 100 to determine which of the storage nodes of the cluster (e.g., three nodes of FIG. 1) are performing which role. In this example, primary node 110 is the primary node for quorum data store 100 and secondary node 115 is the backup node for quorum data store 100. Each of the nodes of quorum data store 100 may share some common components that may not be identical to each other, but for the purposes of this disclosure may be considered functionally equivalent. For example, each node includes a processor 120 and each of the quorum actors (e.g., primary node 110 and secondary node 115) include storage volume(s) 125. Storage volume(s) 125 represent logical data storage that may be implemented on one or more storage devices (e.g., disks not shown) for which redundancy is provided by quorum data store 100 and may be implemented using redundant local storage techniques like the RAID infrastructure mentioned above or other storage techniques. Each of storage volume(s) may be implemented on any suitable type of storage device (e.g., an HDD, an SDD, or the like).

FIG. 1 also illustrates two different types of heartbeat messages between different nodes of quorum data store 100. Non-persistent heartbeats 130 that represent heartbeats with less overhead processing (e.g., stored to low latency storage) are illustrated as dotted line arrows that are only passed between quorum actors (as indicated by element 140 of FIG. 1). Recall that quorum actors for a quorum data store are the subset of members of a quorum data store that store data for the quorum data store. Accordingly, primary node 110 and secondary node 115, that each have storage volume(s) 125, are quorum actors for quorum data store 100, in this example, and witness node 105 is a member of quorum data store 100 but is not a quorum actor. Thus, non-persistent heartbeats 130 are not illustrated as being sent to witness node 105. In contrast, persistent heartbeat message 135 is shared between all three nodes of quorum data store 100, each is illustrated as a solid line arrow. In some implementations, a non-actor witness node may also receive a non-persistent heartbeat message 130, but that is not the case in the example of FIG. 1.

Arrows are used in FIG. 1 to represent persistent heartbeat message 135 and non-persistent heartbeat message 130 such as the above described heartbeat messages to share information amongst nodes working together (e.g., In quorum data store 100). The heartbeat messages (both persistent and non-persistent) may be used to propagate state information for each of the nodes throughout the cluster of nodes participating in quorum data store 100. The direction of the arrows in FIG. 1 represent the direction of the individual heartbeat messages. Data may also be propagated (not shown) between quorum members periodically so that the contents of a quorum state database (not shown) remains consistent (after propagation) on each quorum member. For example, a node may be able to have read/write access for its own state and have read access to the state information (e.g., record in the quorum state store) associated with all other cluster nodes that are members of the same quorum data store (e.g., quorum data store 100 in FIG. 1). In this example, witness 105, primary node 110, and secondary node 115 may have read access to quorum state database records belonging to each other but not to any quorum state database records of any other quorum. That is, quorum state databases may be maintained internally to members of the quorum only. This is true even if some nodes of the one quorum share nodes of a cluster with the nodes of a different quorum data store. That is, a quorum data store may or may not have a one-to-one correlation with a cluster, as a quorum data store may be hosted in a subset of a cluster and different quorum data stores may be hosted on a single cluster. These overlapping cases represent a more complicated configuration than is shown in FIG. 1 and are discussed in more detail below with reference to FIGS. 2-4.

Figure 2:
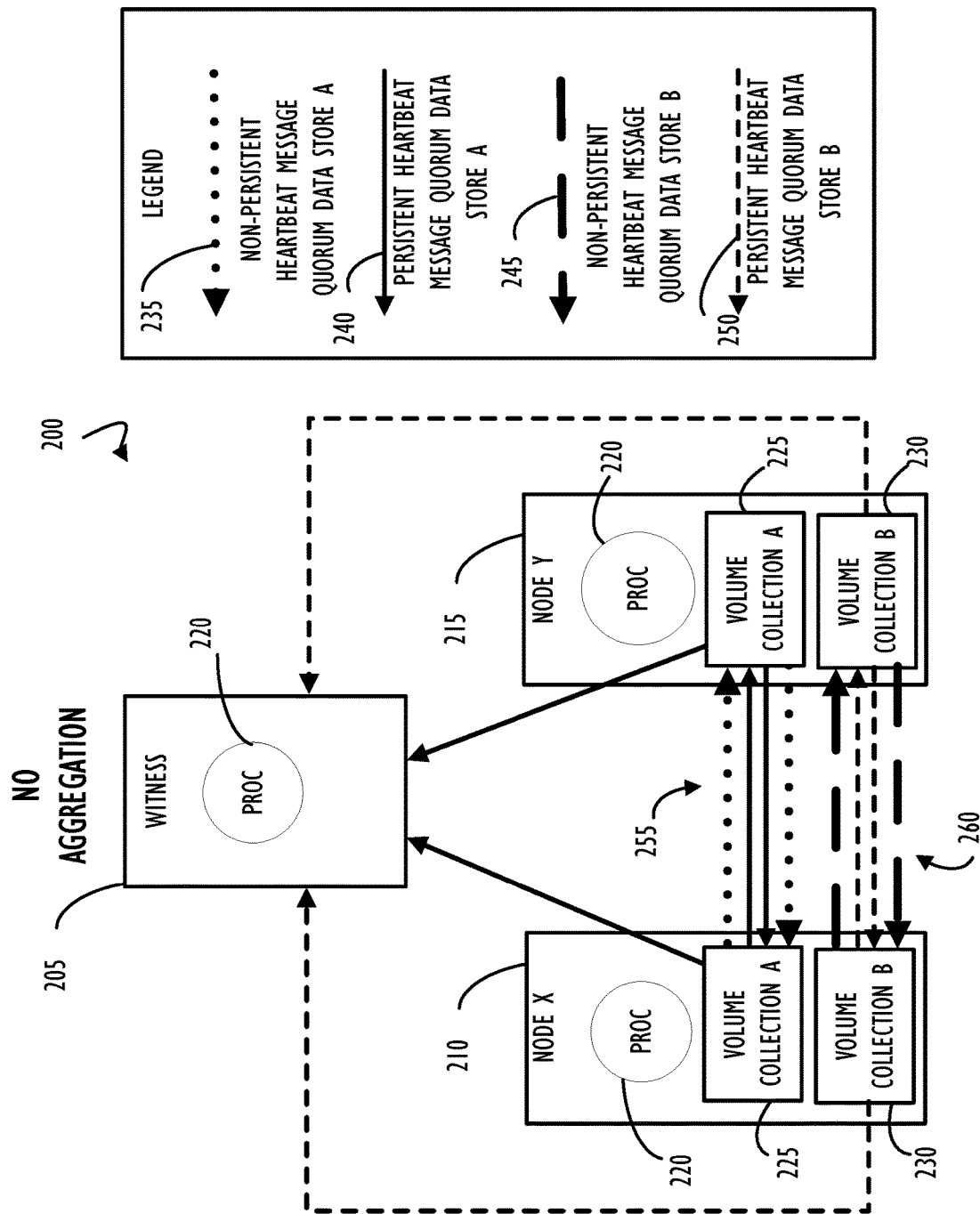
FIG. 2 is a block diagram representing one possible example of non-persistent heartbeat messages used in coordination with persistent heartbeat messages and no aggregation of messages from any given node, according to one or more disclosed examples.

Referring now to FIG. 2, block diagram 200 illustrates a representation of one possible example of non-persistent heartbeat messages used in coordination with persistent heartbeat messages with no aggregation of messages from any given node, according to one or more disclosed implementations. In the example of FIG. 2, there are two quorum data stores illustrated and referenced as quorum A and quorum B, respectively. Each of these two quorum data stores has a quorum witness 205 and two quorum actors, namely Node X 210 and Node Y 215. Each quorum actor has a volume collection for their respective quorum. Specifically, volume collection A 225 is on each of Node X 210 and Node Y 215 to represent the storage for quorum data store A. Additionally, volume collection B 230 is also on both of Node X 210 and Node Y 215 to represent the storage for quorum data store B. As discussed above for FIG. 1, each node in the quorum is illustrated to have a processor 220.

Also illustrated in FIG. 2 are several different heartbeat messages representing heartbeat messaging between different nodes of each quorum data store. Quorum data store A is illustrated to have heartbeat messages between the two quorum actors (Node X 210 and Node Y 215) for volume collection A 225. Quorum data store A also has a witness node 205. Block diagram 200 also illustrates types and direction for both persistent and non-persistent heartbeat messages that communicate state (e.g., via a quorum state store not shown) between members of quorum data store A. A non-persistent heartbeat message for quorum data store A 235 is illustrated as a dotted line arrow and flows between Node X 210 and Node Y 215 (see area 255). Additionally, a persistent heartbeat message for quorum data store A 240 is illustrated as a solid line arrow and flows between Node X 210 and Node Y 215 in each direction as illustrated in area 255. Note that the persistent heartbeat message for quorum data store A 240 is also illustrated as a solid line arrow from each quorum actor (i.e., Node X 210 and Node Y 215) to quorum witness 205. Recall, as discussed above, non-persistent heartbeats, in some implementations of this disclosure, are only shared between quorum actors with a quorum witness only receiving persistent heartbeat messages. Thus, network traffic to a quorum witness may be reduced while still maintaining high frequency non-persistent heartbeat messages between quorum actors. FIG. 2 also illustrates a second quorum data store as quorum data store B supporting volume collection B 230 with non-persistent heartbeat messages for quorum data store B 245 (bold dashed line arrow at area 260) and persistent heartbeat messages for quorum data store B 250 (standard dashed line arrow) flowing between quorum actors (e.g., Node X 210 and Node Y 215 as shown at area 260) in addition to flowing from each of Node X 210 and Node Y 215 to quorum witness 205 in a similar manner to that for quorum data store A. As illustrated in FIG. 2, with no aggregation there are 4 distinct non-persistent heartbeat messages and 8 distinct persistent heartbeat messages with each quorum actor (Node X 210 and Node Y 215) processing a total of 10 inbound or outbound heartbeat messages and quorum witness 205 processing each of the 4 persistent heartbeat messages.

Figure 3:
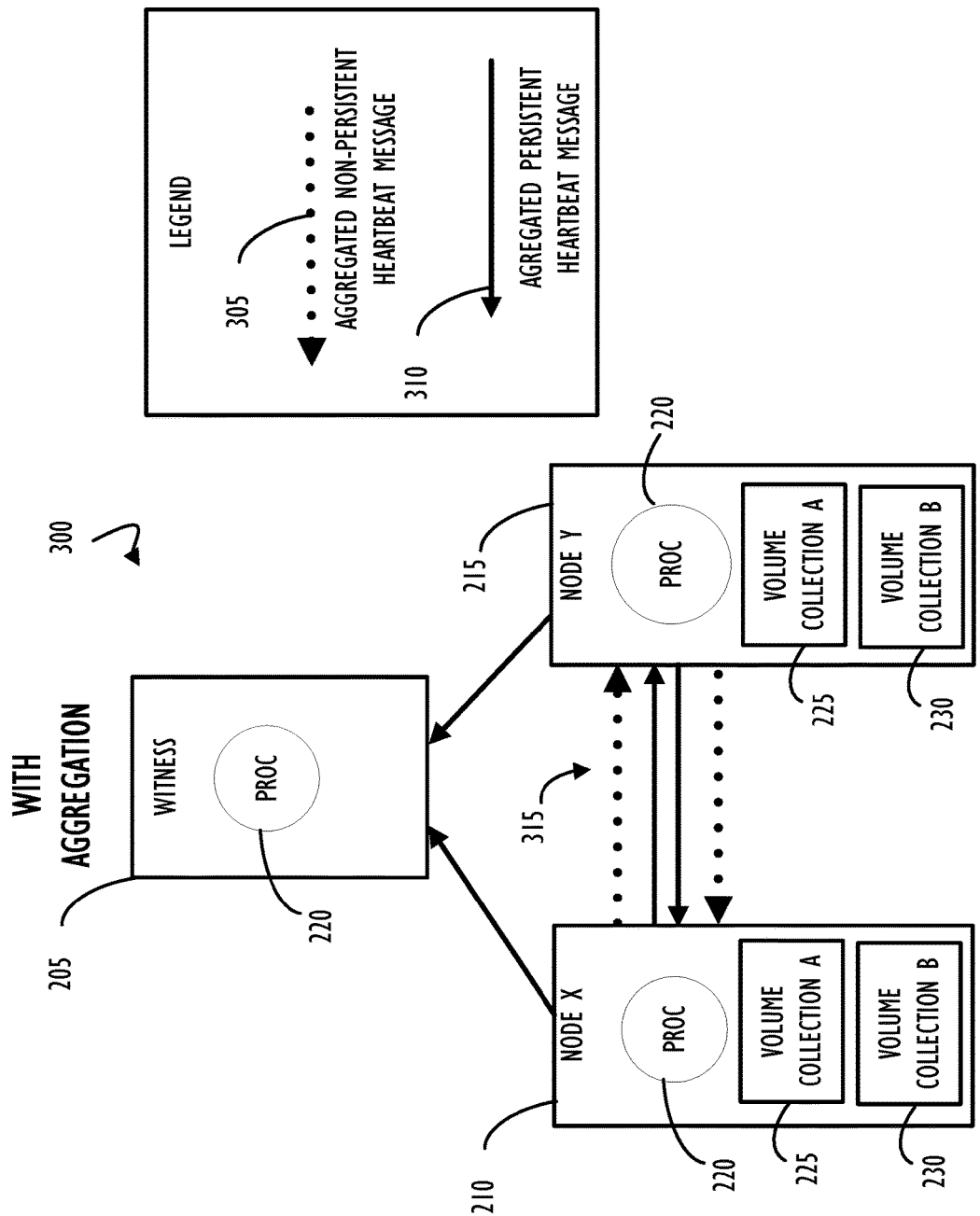
FIG. 3 is a block diagram representing one possible example of the network of FIG. 2 updated to include aggregated node level heartbeat messages, according to one or more disclosed examples.

Referring now to FIG. 3, block diagram 300 illustrates a representation of one possible example of quorums A and B of FIG. 2 updated to include aggregated node level heartbeat messages, according to one or more disclosed implementations. Block diagram 300 illustrates the same quorum data store structure as that of FIG. 2 except it consolidates a set of non-persistent heartbeat messages between nodes that are quorum actors (e.g., Node X 210 and Node Y 215) into an aggregated non-persistent heartbeat message 305 (illustrated as a dotted line arrow at area 315) and a set of persistent heartbeat messages between all members of the quorum into an aggregated persistent heartbeat message 310 (illustrated at area 315 and flowing into witness 205). As can be seen by the comparison of FIG. 2 to FIG. 3, a total number of heartbeat messages may be reduced through aggregation. Thus, the total number of heartbeat messages has been reduced from 4 non-persistent heartbeat messages to 2 non-persistent heartbeat messages and the total number of persistent heartbeat messages has similarly been reduced by half. The examples of FIG. 2 and FIG. 3 are for illustration and explanation only. They are relatively simple examples with only a few nodes and two quorums, however, it should be clear that a substantial reduction in heartbeat messages (both persistent heartbeat messages and non-persistent heartbeat messages) may be achieved for more complicated scenarios when heartbeat message aggregation is implemented. Additionally, it is not required for all quorum data stores on a node to participate in aggregation and, based on design considerations, some nodes may have a combination of both aggregated heartbeats and individual heartbeat messages (e.g., non-aggregated as shown in FIG. 2) concurrently.

Figure 4:
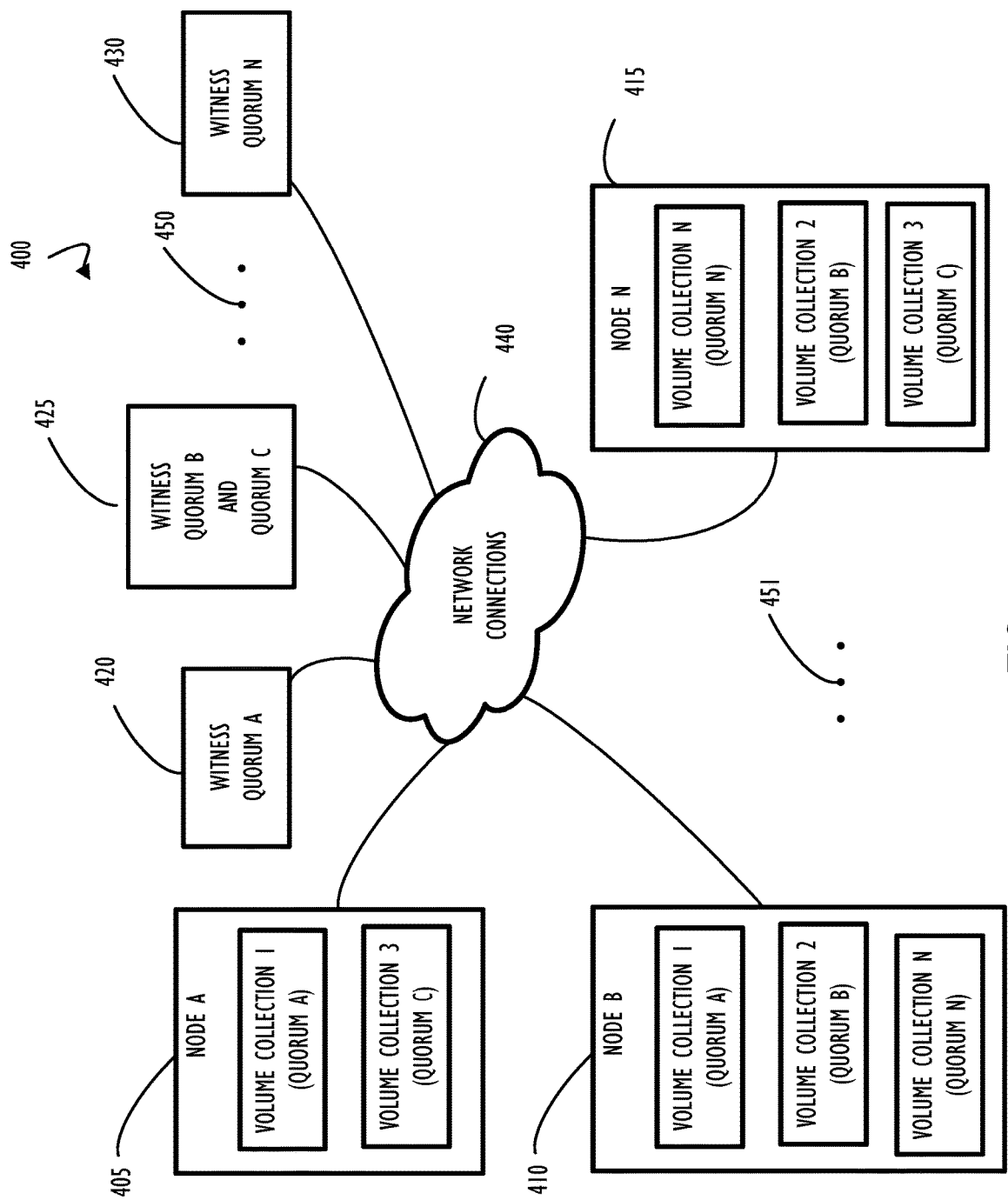
FIG. 4 is a block diagram representation of a distributed network environment including multiple computers (e.g., systems) and quorums of redundant data storage hosted by the multiple computers, according to one or more disclosed examples.

Referring now to FIG. 4, block diagram 400 illustrates a representation of a distributed network environment including multiple computers (e.g., systems) and multiple quorum data stores of redundant data storage hosted by the multiple computers, according to one or more disclosed implementations. In this example there are multiple nodes, witnesses, quorums (for ease of reading "quorum" is a shorthand reference in this example for quorum data store), and network connections represented. Any number of these elements is possible. In the example of FIG. 4, Node 1 405 hosts quorums A and C; Node 2 410 hosts quorums A, B, and N; and Node N 415 hosts quorums N, B, and C. Each of these quorums has a witness as illustrated by witness for quorum A 420, witness for quorums B and C 425, and witness for quorum N 430. Ellipses 450 indicates that any number of witness nodes may be possible. Ellipses 451 indicates that any number of nodes may be possible. In short, a member of a quorum may send/receive heartbeat messages (either persistent heartbeat messages or non-persistent heartbeat messages) with other nodes that are members of the same quorum.

Also, in block diagram 400, network connections are represented as network connections cloud 440 to illustrate that there are many different ways to implement a network. For example, networks may have different topologies (e.g., bus, ring, mesh, star, tree, etc.). Also, networks may be implemented using different technologies for the physical layer (e.g., of the Open Systems Interconnection (OSI) model). Network communication devices may be used to interconnect different topologies of networks and types of networks to allow devices having many different types of network connections to communicate with each other. Further, direct communication between nodes may only be required for nodes sharing a heartbeat with each other because, as explained above, data in a quorum state store may be propagated throughout the quorum via other quorum members. In some cases, there may even be a one-way connection between nodes rather than a bi-directional communication connection. In a one-way connection implementation, a heartbeat message from a primary may be monitored by a backup but the backup does not advertise its state directly to the primary.

Figure 5A:
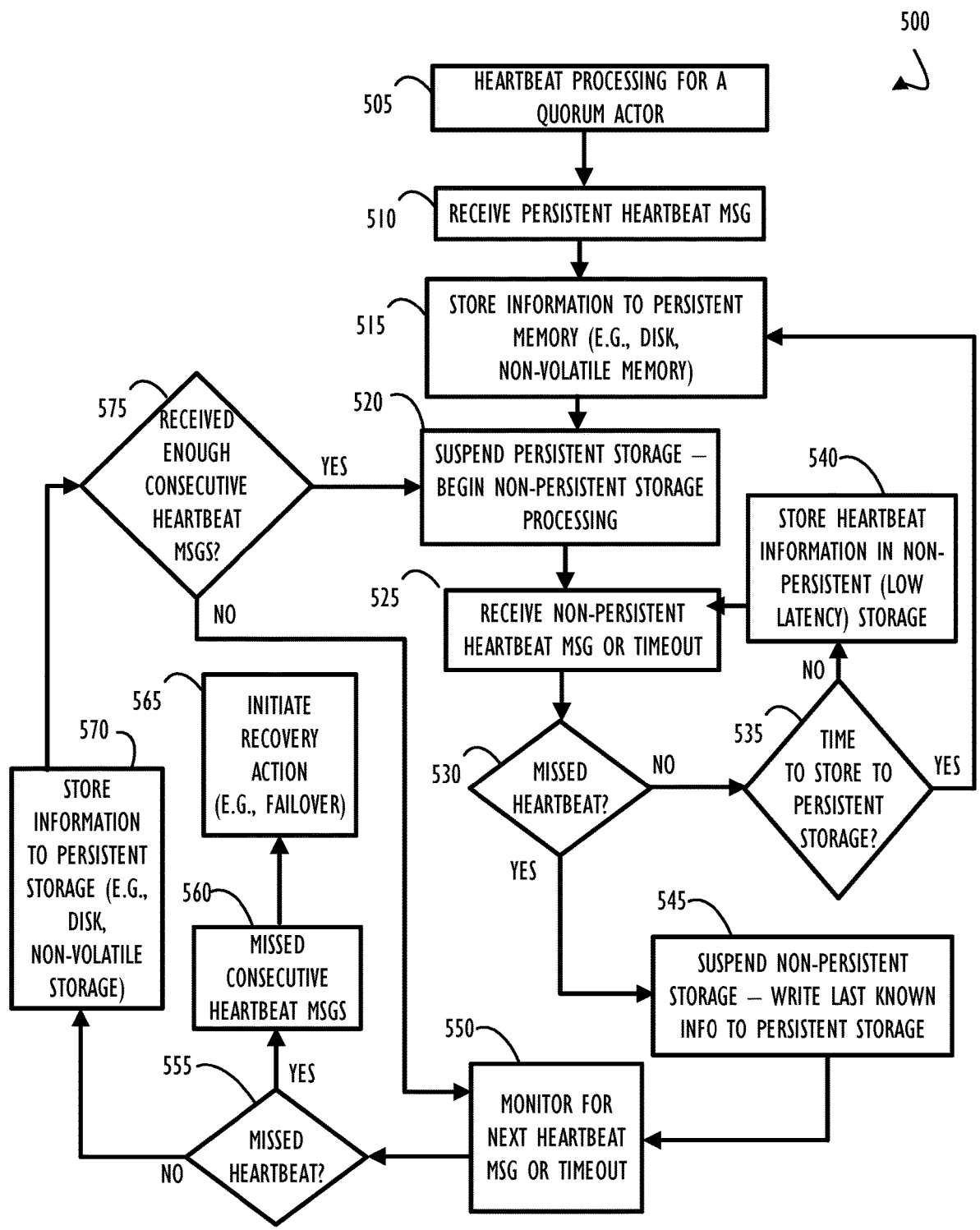
FIG. 5A is a flow chart representing a possible receiver side method for heartbeat processing across nodes of a quorum data store including both non-persistent heartbeats and persistent heartbeats (possibly having aggregated heartbeats), according to one or more disclosed examples.
Figure 5B:
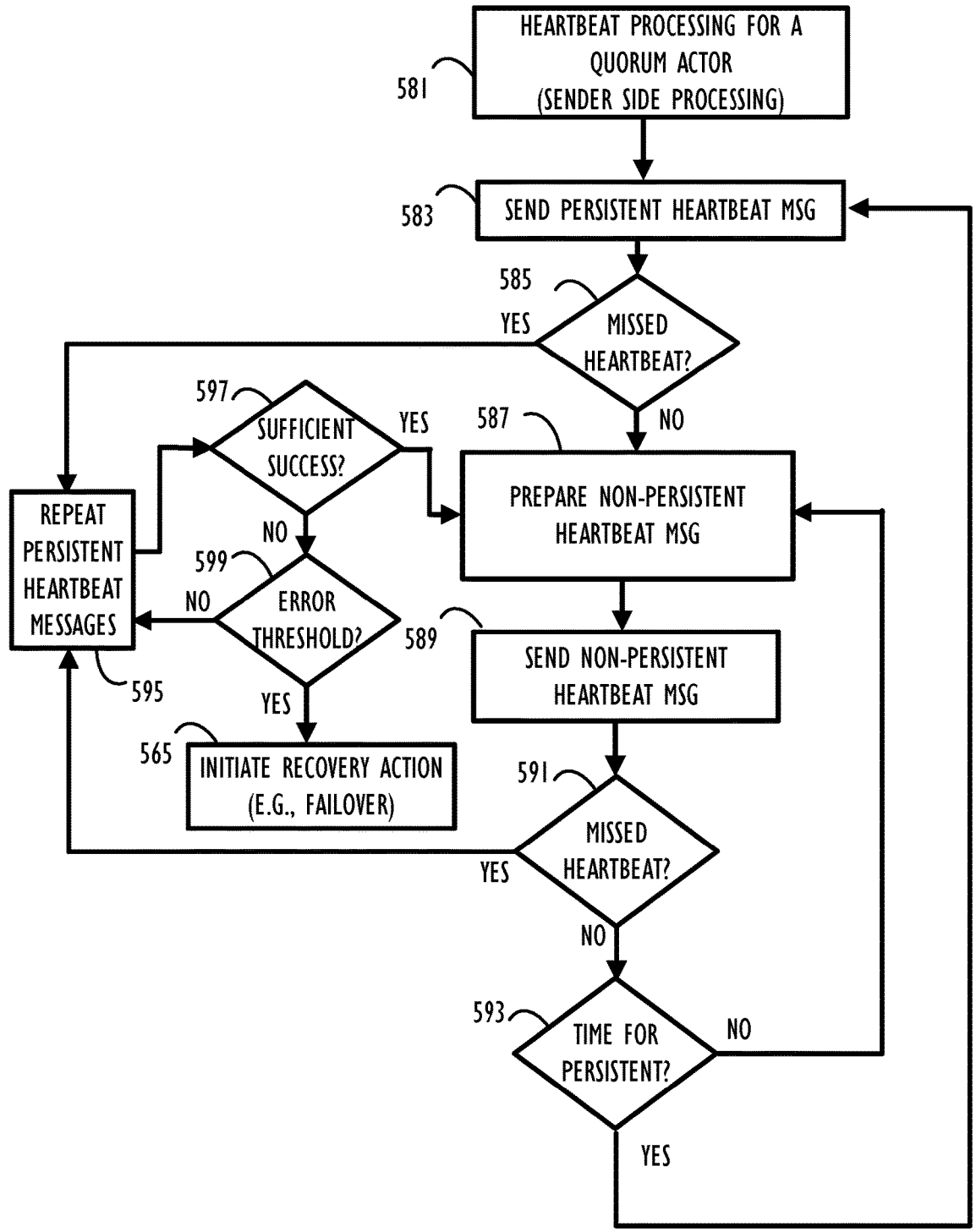
FIG. 5B is a flow chart representing a sender side implementation of heartbeat processing across nodes of a quorum data store including both persistent heartbeats and non-persistent heartbeats, according to one or more disclosed examples.

FIGS. 5A and 5B are flow charts representing two possible methods (500 and 580) to provide heartbeat processing across nodes of a quorum including both non-persistent heartbeats and persistent heartbeats (either of these possibly being aggregated heartbeats), according to one or more disclosed implementations. In the example of FIG. 5A, for a receiver side implementation, there may be no distinction between a non-persistent heartbeat message and a persistent heartbeat message as far as contents. In that example, a selected subset of all received heartbeat messages are treated as a persistent heartbeat message. This is only one design possibility and others exist. For example, a sender side implementation (with possibly different message formats for persistent heartbeat messages and non-persistent heartbeat messages) is illustrated as method 580 in FIG. 5B.

Method 500 begins at block 505 where heartbeat message processing for a quorum actor begins. The example of method 500 illustrates processing that may be performed on a node that is receiving a heartbeat message. At block 510 a heartbeat message is initially received and processed as a persistent heartbeat message by storing heartbeat information contained in the received heartbeat message to higher-latency persistent storage. Block 515 indicates that information from the heartbeat messages may be stored persistently. Flow continues to block 520 where processing to persistent storage may be suspended in favor of more efficient (i.e., faster because of low latency) non-persistent storage. This suspension may take place as long as consistent heartbeat message processing continues with only periodic storage to persistent storage at a configurable interval as explained in more detail for the remainder of method 500.

Continuing with method 500, Block 525 indicates that a non-persistent heartbeat message may be either determined to be received by message acknowledgement or determined to be missed based on a timeout of its expected arrival. Decision 530 determines if there is a missed heartbeat message. If not, the NO prong of decision 530, normal processing is occurring, and flow continues to decision 525 where a determination may be made as to if it is time (e.g., based on a pre-defined interval of time or number of messages) to store information to persistent storage. If it is not yet time to store information to persistent storage, the NO prong of decision 535, flow continues to block 540 where heartbeat information may be stored to low-latency (e.g., relatively fast) non-persistent memory. Flow then returns to block 525 for the next heartbeat message. However, if at decision 535, enough non-persistent heartbeat messages have been processed or enough time has passed since persistent heartbeat message processing, the YES prong of decision 535, flow returns to block 515 where a non-persistent message may be made persistent (e.g., out of cycle because of potential issue). In this example, periodic storage to persistent storage is performed so that relatively current information may be available after a loss of power, because, as explained above, if information is not stored in persistent memory, it may not (and likely will not) survive a power loss.

Returning to decision 530, if there is a missed heartbeat message, the YES prong of decision 530, flow continues to block 545 where non-persistent heartbeat message processing of information may be suspended in favor of persistent heartbeat message processing. In this case, a missed heartbeat message may be an indication that something is not functioning property, and a failure may be about to occur. Accordingly, the system may sacrifice efficiency for a period of time to determine if the error (i.e., the missed heartbeat message) was an intermittent error or if a more serious condition may be evolving. Block 550 indicates that monitoring may be performed to ensure the next heartbeat message, the one expected directly after the missed heartbeat message (consecutive heartbeat message), is received or if there is a timeout prior to receipt. Decision 555 determines if there is another missed heartbeat message. If so, the YES prong of decision 555, flow continues to block 560 where it may be determined if consecutive heartbeat messages have been missed. Flow may then continue to block 565 to initiate a recovery action for the lost node, for example, a failover if the lost node was a primary for any functions. Different levels of tolerance to missed heartbeat messages may be implemented and may be based on design criteria such as the criticality of the function being performed. However, if decision 555 indicates that no subsequent heartbeat messages have been missed, the NO prong of decision 555, flow continues to block 570 where heartbeat information may be stored to persistent memory. Flow then continues to decision 575 where a determination may be made as to whether or not to return to more efficient non-persistent heartbeat message processing. If there is still a concern of possible failure because not enough consecutive heartbeat messages have been received, or a sufficient amount of time has not elapsed (both configurable options), the NO prong of decision 575, flow returns to block 550 to wait for the next heartbeat message (or timeout). However, if it is determined that the error was likely intermittent, and no failure is expected, the YES prong of decision 575, flow returns to block 520 were the more efficient non-persistent heartbeat message processing may be initiated again (e.g., intermixed with periodic persistent heartbeat message processing). In this manner, a node may toggle between non-persistent heartbeat message processing and persistent heartbeat message processing. Thus, a reduction in load and delays may be achieved for systems performing properly (e.g., no missed heartbeat messages) while still maintaining heartbeat information on persistent storage to be used in case of failure.

In the example of FIG. 5B, a sender could send two different types of heartbeat messages (e.g., a persistent heartbeat message and a non-persistent heartbeat message may have different message formats). Because TCP provides a guaranteed delivery of a message (or a timeout of that message) a sender may be able to tell that one of their messages was not delivered to a destination. Accordingly, that sender may automatically be aware that the heartbeat message was "missed" at the destination. In this example, the sender could then alter the type of heartbeat message that is being sent. Specifically, if a heartbeat message times out for transmission/delivery, that sending node can change to sending persistent heartbeat messages for a period of time (or number of messages) in a similar manner to that of FIG. 5A. That is, a sender may implement a similar looping mechanism as shown to execute on the receiver in FIG. 5A.

The sender side implementation example of FIG. 5B is illustrated in flow chart 580 and begins at block 582 where heartbeat processing is initiated for a quorum actor (e.g., the initiator of the heartbeat message). Block 583 illustrates that an initial message may be a persistent heartbeat message to beginning the process with information stored persistently on the receiving side. Decision 585 indicates that a determination may be made as to if the heartbeat message was successfully received at its destination. For example, if either an acknowledgement or a timeout for the network transmission of the heartbeat message is returned to the sender. If so, the YES prong of decision 583, flow continues to block 595 where repeated persistent heartbeat messages may be sent. If not, the NO prong of decision 585, flow continues to block 587 where a non-persistent (and more efficient as far as overall processing resources) heartbeat message may be prepared. Block 589 indicates that a non-persistent heartbeat message may be sent. Decision 591 determines if the non-persistent heartbeat message was successfully delivered to its destination. If it was successfully delivered, the NO prong of decision 591, flow continues to decision 593 where a determination of whether or not it is time to send a persistent heartbeat message. This determination may be made by the sender based on a count of non-persistent heartbeat messages or based on a timer depending on implementation criteria. If it is not time to send a persistent heartbeat message, the NO prong of decision 593, flow returns to block 587 to prepare and send another non-persistent heartbeat message. However, if it is determined that a next heartbeat message should be a persistent heartbeat message, the YES prong of decision 593, flow returns to block 583 where a persistent heartbeat message may be provided as the next heartbeat message.

Returning to block 595, which may be reached based on a missed heartbeat message from either of decisions 585 or 591 as discussed above, persistent heartbeat messages may be repeated for a period of time (or number of messages). Flow from block 595 goes to decision 597 where a determination may be made if there has been sufficient success in sending repeated persistent heartbeat messages such that a return to non-persistent heartbeat messages may be performed. If so, the YES prong of decision 597, flow returns to block 587 where the above described loop of non-persistent heartbeat messages may be entered again. However, if there has not been sufficient success, the NO prong of decision 597, flow continues to decision 599 where a determination may be made as to if an error threshold (e.g., for missed heartbeat messages) has been reached. If not, the NO prong of decision 599, flow returns to block 595 for another repeat of the persistent heartbeat message. Alternatively, if there is an error threshold crossing, the YES prong of decision 599, flow may continue to block 565 (duplicated from flow 500 in FIG. 5A) where a recovery action may be initiated as described above. As noted above, in some implementations, missing a single heartbeat message of either type may be sufficient to immediately initiate recovery actions as explained for block 565. That is, in these immediate action type implementations, flow may go directly from either decision 585 or 591 to block 565.

Figure 6:
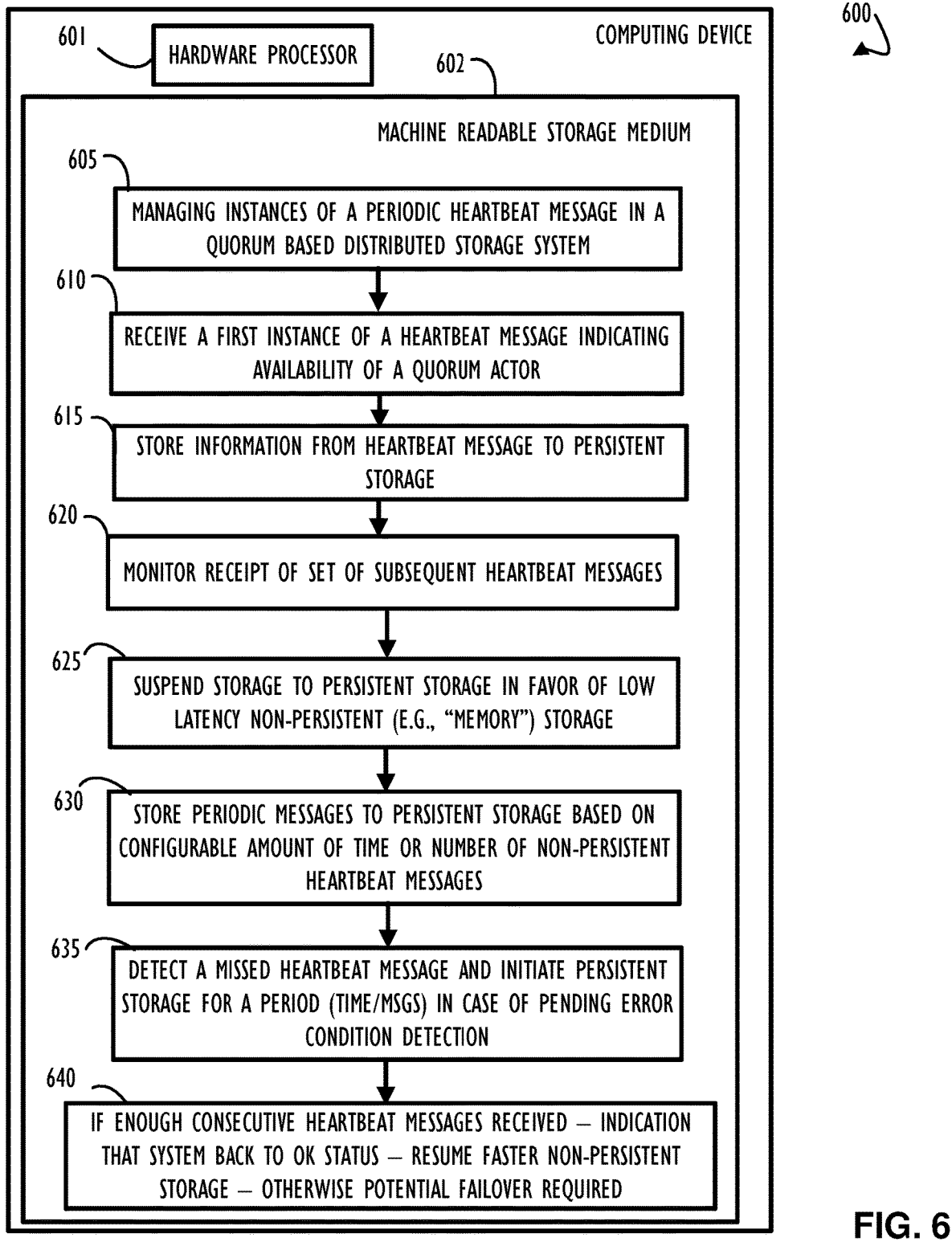
FIG. 6 is a block diagram representing a computing device implementing a method to support heartbeat processing across nodes of a quorum data store, according to one or more disclosed examples.

FIG. 6 is a block diagram representing a computing device 600 implementing a method to support heartbeat processing across nodes of a quorum data store, according to one or more disclosed implementations. Computing device 600 includes a hardware processor 601 and a machine readable storage medium 602. As illustrated, machine readable medium 602 may store instructions, that when executed by hardware processor 601 (either directly or via emulation/ virtualization), cause hardware processor 601 to perform one or more disclosed methods to support heartbeats transmitted between members of a quorum data store. In this example, the instructions stored reflect a method similar to method 500 discussed above.

Beginning at block 605, the stored instruction may be directed toward managing instances of periodic heartbeat messages (either persistent or non-persistent) in a quorum based distributed storage system (e.g., a quorum data store). Block 610 indicates that a first instance of a heartbeat message may be received that indicates availability status of another quorum actor. Block 615 indicates that information from the heartbeat message may be processed as a persistent heartbeat message and may be stored to persistent storage. Block 620 indicates that computing device 600 may monitor receipt of multiple subsequent heartbeat messages. Based on the monitoring, block 625 indicates that storage to persistent, relatively higher latency storage, may be suspended in favor of lower latency non-persistent storage. For example, as explained for method 500 above. Block 630 indicates that persistent storage of heartbeat information may still be used periodically to ensure that information may be available if non-persistent memory storage is lost for some reason. Block 635 indicates that a detected missed heartbeat message may case computing device 600 to "fall back" to persistent heartbeat message processing for a period of time or number of messages. Block 640 indicates that if there have been enough persistent heartbeat messages processed without missing further persistent heartbeat messages the system may again resume the more efficient non-persistent heartbeat message processing (e.g., non-persistent memory based). Otherwise, if heartbeat message processing is not performing consistently, block 640 also indicates that computing device 600 may initiate appropriate recovery action (e.g., for the lost quorum member or all quorum members on a node of a cluster if aggregated messaging is being used).

Figure 7:
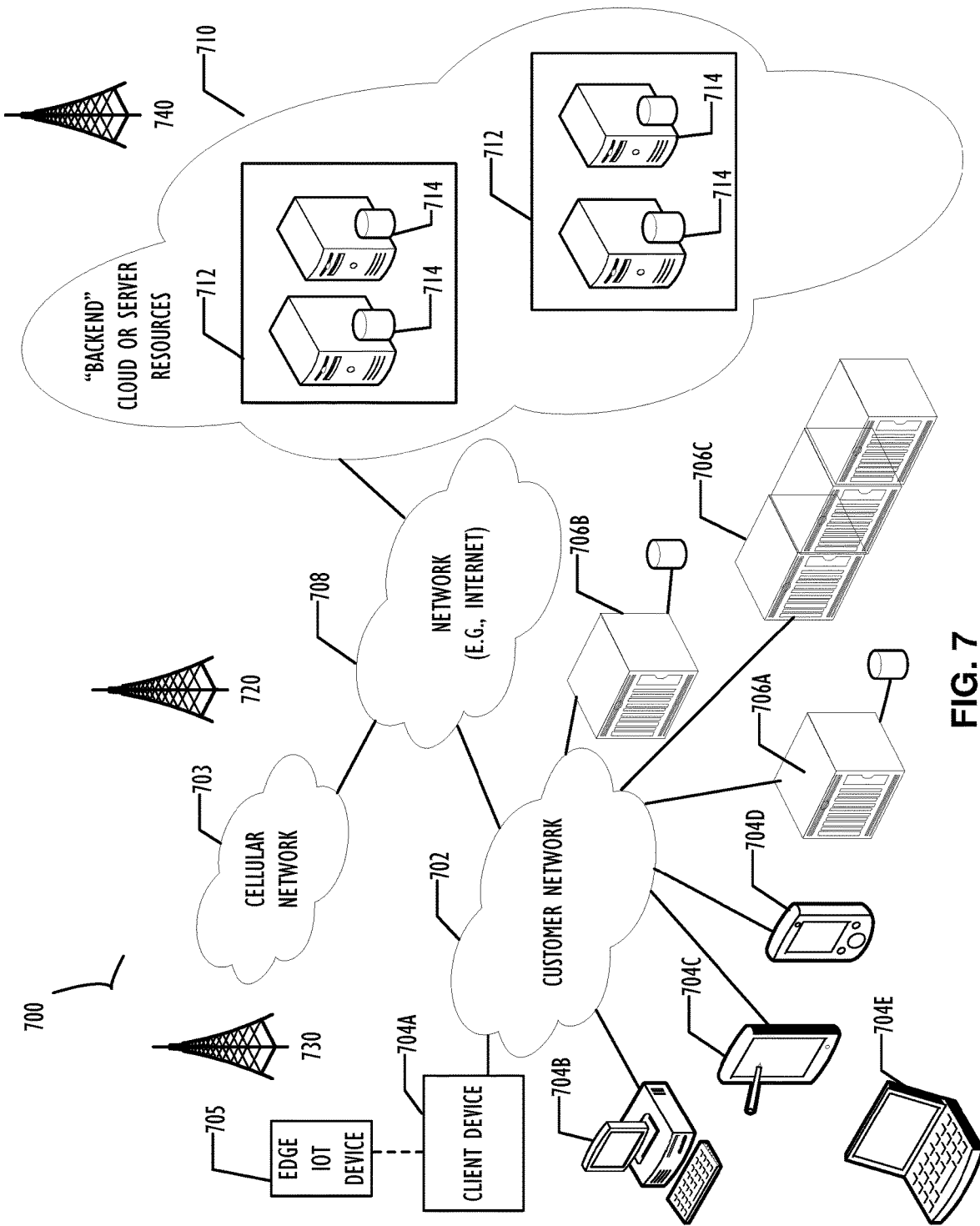
FIG. 7 represents a computer network infrastructure that may be used to implement all or part of the disclosed quorum heartbeat message processing, according to one or more disclosed examples.

FIG. 7 represents a computer network infrastructure that may be used to implement all or part of the disclosed persistent and non-persistent heartbeat message processing, according to one or more disclosed implementations. Network infrastructure 700 includes a set of networks where implementations of the present disclosure may operate. For example, there may be quorum data stores implemented within hardware clusters that have nodes at different locations (e.g., data centers) and those data centers may communicate with each other through network infrastructure 700. Network infrastructure 700 comprises a customer network 702, network 708, cellular network 703, and a cloud service provider network 710. Any of these networks may have nodes providing or receiving heartbeat messages or may contain a quorum data store configured in accordance with this disclosure. That is, each of these different networks may include one or more redundant quorum data storage implementations that may benefit from the concepts of this disclosure. In one implementation, the customer network 702 may be a local private network, such as local area network (LAN) that includes a variety of network devices that include, but are not limited to switches, servers, and routers.

Each of these networks can contain wired or wireless programmable devices and operate using any number of network protocols (e.g., TCP/IP) and connection technologies (e.g., WiFI® networks, or Bluetooth®. In another implementation, customer network 702 represents an enterprise network that could include or be communicatively coupled to one or more local area networks (LANs), virtual networks, data centers and/or other remote networks (e.g., 708, 710). In the context of the present disclosure, customer network 702 may include one or more high-availability data stores (e.g., quorum data store), switches, or network devices using methods and techniques such as those described above.

As shown in FIG. 7, customer network 702 may be connected to one or more client devices 704A-E and allow the client devices 704A-E to communicate with each other and/or with cloud service provider network 710, via network 708 (e.g., Internet). Client devices 704A-E may be computing systems such as desktop computer 704B, tablet computer 704C, mobile phone 704D, laptop computer (shown as wireless) 704E, and/or other types of computing systems generically shown as client device 704A. In this context, client devices should not be confused with a client application of a server-based application (or distributed application) because they represent devices in a client-server architecture rather than applications. However, while it is true that client devices may often run client applications, there are situations where a client device will execute the server side of a client-server application such that the client device communicates with a server device (e.g., executing the client application) to request remote execution on behalf of the client device. That is, the client device may execute a server application portion with the server device executing the client application portion for a given client-server application architecture. In general, the client portion of an application is the portion that requests some work and receives the results of the work, with the server portion receiving the request for work, performing that work, and providing the results.

Network infrastructure 700 may also include other types of devices generally referred to as Internet of Things (IoT) (e.g., edge IOT device 705) that may be configured to send and receive information via a network to access cloud computing services or interact with a remote web browser application (e.g., to receive configuration information).

FIG. 7 also illustrates that customer network 702 includes local compute resources 706A-C that may include a server, access point, router, or other device configured to provide for local computational resources and/or facilitate communication amongst networks and devices. For example, local compute resources 706A-C may be one or more physical local hardware devices to support a quorum datastore as outlined above. Local compute resources 706A-C may also facilitate communication between other external applications, data sources (e.g., 707A and 707B), and services, and customer network 702.

Network infrastructure 700 also includes cellular network 703 for use with mobile communication devices. Mobile cellular networks support mobile phones and many other types of mobile devices such as laptops etc. Mobile devices in network infrastructure 700 are illustrated as mobile phone 704D, laptop computer 704E, and tablet computer 704C. A mobile device such as mobile phone 704D may interact with one or more mobile provider networks as the mobile device moves, typically interacting with a plurality of mobile network towers 720, 730, and 740 for connecting to the cellular network 703.

FIG. 7 illustrates that customer network 702 is coupled to a network 708. Network 708 may include one or more computing networks available today, such as other LANs, wide area networks (WAN), the Internet, and/or other remote networks, in order to transfer data between client devices 704A-D and cloud service provider network 710. Each of the computing networks within network 708 may contain wired and/or wireless programmable devices that operate in the electrical and/or optical domain.

In FIG. 7, cloud service provider network 710 is illustrated as a remote network (e.g., a cloud network) that is able to communicate with client devices 704A-E via customer network 702 and network 708. The cloud service provider network 710 acts as a platform that provides additional computing resources to the client devices 704A-E and/or customer network 702. In one implementation, cloud service provider network 710 includes one or more data centers 712 with one or more server instances 714. Cloud service provider network 710 may also include one or more frames or clusters (and cluster groups) representing a scalable compute resource that may benefit from the techniques of this disclosure. Also, cloud service providers typically require near perfect uptime availability and may use the disclosed techniques, methods, and systems to provide that level of service.

Figure 8:
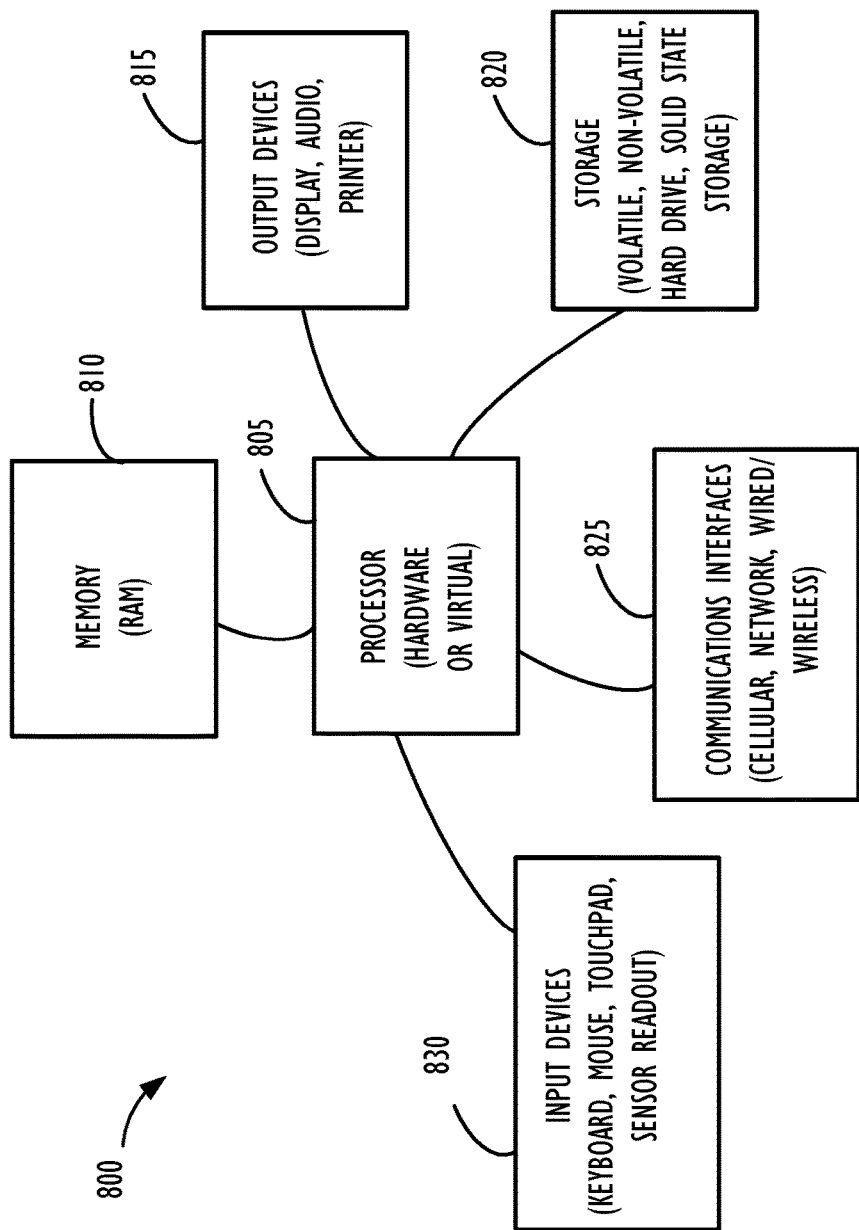
FIG. 8 illustrates an example computer processing device that may be used to implement the functions, modules, processing platforms, execution platforms, communication devices, and other methods and processes of this disclosure.

FIG. 8 illustrates a computing device 800 that may be used to implement or be used with the functions, modules, processing platforms, execution platforms, communication devices, and other methods and processes of this disclosure. For example, computing device 800 illustrated in FIG. 8 could represent a client device or a physical server device as illustrated in any of FIGS. 1-4 or 6-7 and include either hardware or virtual processor(s) depending on the level of abstraction of the computing device. Specifically, each of the quorum witness nodes and quorum actor nodes discussed above may be considered instances of a computing device similar to computing device 800. Accordingly, multiple instances of computing device 800 and processor 805 may be used to implement the above disclosed methods and systems for a quorum data store. In some instances (without abstraction), computing device 800 and its elements, as shown in FIG. 8, each relate to physical hardware. Alternatively, in some instances one, more, or all of the elements could be implemented using emulators or virtual machines as levels of abstraction. In any case, no matter how many levels of abstraction away from the physical hardware, computing device 800 at its lowest level may be implemented on physical hardware.

As also shown in FIG. 8, computing device 800 may include one or more input devices 830, such as a keyboard, mouse, touchpad, or sensor readout (e.g., biometric scanner) and one or more output devices 815, such as displays, speakers for audio, or printers. Some devices may be configured as input/output devices also (e.g., a network interface or touchscreen display).

Computing device 800 may also include communications interfaces 825, such as a network communication unit that could include a wired communication component and/or a wireless communications component, which may be communicatively coupled to processor 805. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 8, computing device 800 includes a processing element such as processor 805 that contains one or more hardware processors, where each hardware processor may have a single or multiple processor cores. In one implementation, the processor 805 may include at least one shared cache that stores data (e.g., computing instructions) that are utilized by one or more other components of processor 805. For example, the shared cache may be a locally cached data stored in a memory for faster access by components of the processing elements that make up processor 805. In one or more implementations, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) and a microprocessor. Although not illustrated in FIG. 8, the processing elements that make up processor 805 may also include one or more of other types of hardware processing components, such as graphics processing units (GPU), application specific integrated circuits (ASICs), field-programmable gate arrays (FPGAs), and/or digital signal processors (DSPs).

FIG. 8 illustrates that memory 810 may be operatively and communicatively coupled to processor 805. Memory 810 may be a non-transitory medium configured to store various types of data. For example, memory 810 may include one or more storage devices 820 that comprise a non-volatile storage device and/or volatile memory. Volatile memory, such as random-access memory (RAM), can be any suitable non-permanent storage device. The non-volatile storage devices 820 can include one or more disk drives, optical drives, solid-state drives (SSDs), tap drives, flash memory, read only memory (ROM), and/or any other type of memory designed to maintain data for a duration of time after a power loss or shut down operation. In certain instances, the non-volatile storage devices 820 may be used to store overflow data if allocated RAM is not large enough to hold all working data. The non-volatile storage devices 820 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 805. In one implementation, the compiling process of the software program may transform program code written in a programming language to another computer language such that the processor 805 is able to execute the programming code. For example, the compiling process of the software program may generate an executable program that provides encoded instructions (e.g., machine code instructions) for processor 805 to accomplish specific, non-generic, particular computing functions.

After the compiling process, the encoded instructions may then be loaded as computer executable instructions or process steps to processor 805 from storage device 820, from memory 810, and/or embedded within processor 805 (e.g., via a cache or on-board ROM). Processor 805 may be configured to execute the stored instructions or process steps in order to perform instructions or process steps to transform the computing device into a non-generic, particular, specially programmed machine or apparatus. Stored data, e.g., data stored by a storage device 820, may be accessed by processor 805 during the execution of computer executable instructions or process steps to instruct one or more components within the computing device 800.

A user interface (e.g., output devices 815 and input devices 830) can include a display, positional input device (such as a mouse, touchpad, touchscreen, or the like), keyboard, or other forms of user input and output devices. The user interface components may be communicatively coupled to processor 805. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 800 may comprise other components well known in the art, such as sensors, powers sources, and/or analog-to-digital converters, not explicitly shown in FIG. 8.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A computer device, comprising:
   a hardware processor;
   a first network controller communicatively coupled to the first hardware processor and a first network; and
   an instruction memory area communicatively coupled to the first hardware processor, wherein the instruction memory area stores instructions that when executed by the first hardware processor cause the first hardware processor to:
   send, over the first network via the first network controller, a persistent heartbeat message that indicates availability of a quorum actor within a quorum data store, the quorum data store comprising a plurality of quorum actors including a plurality of quorum members, and a quorum witness, the persistent heartbeat message to be stored by a receiving device to a persistent storage memory area;
   send, over the first network via the first network controller, one or more non-persistent heartbeat messages subsequent to the persistent heartbeat message, each non-persistent heartbeat message to be stored by the receiving device to a non-persistent storage memory area;
   monitor receipt of each of the one or more non-persistent heartbeat messages;
   periodically send the persistent heartbeat message in place of one of the one or more non-persistent heartbeat messages, wherein a period for sending corresponds to a first pre-determined time interval;
   detect a missed one of the one or more non-persistent heartbeat messages;
   based on the detection, increase frequency of sending persistent heartbeat messages instead of any non-persistent heartbeat messages for a second pre-determined time interval; and
   based on a determination that each expected persistent heartbeat message has been received for the second pre-determined time interval, decrease frequency of sending persistent heartbeat messages and return to sending the one or more non-persistent heartbeat messages.

2. The computer device of claim 1, wherein the first pre-determined time interval and/or the second pre-determined time interval is based on a number of messages or a configurable time duration.

3. The computer device of claim 1, wherein the instructions to cause the one or more hardware processors to detect a missed one of the one or more non-persistent heartbeat messages comprise instructions to detect based upon a failure of delivery for a TCP transmission.

4. The computer device of claim 1, wherein the instructions to cause the one or more hardware processors to increase frequency comprise instructions to increase frequency of persistent heartbeat messages that are stored to persistent storage upon receipt.

5. The computer device of claim 1, wherein the instructions to cause the one or more hardware processors to decrease frequency comprise instructions to decrease frequency to a frequency equal to the first pre-determined time interval.

6. The computer device of claim 1, wherein the persistent heartbeat message comprises an aggregated heartbeat message containing information from more than one quorum actor on a single node.

7. A non-transitory computer readable medium comprising computer executable instructions stored thereon that when executed by one or more hardware processors, cause the one or more hardware processors to:
- send, over the first network via the first network controller, a persistent heartbeat message that indicates availability of a quorum actor within a quorum data store, the quorum data store comprising a plurality of quorum actors including a plurality of quorum members, and a quorum witness, the persistent heartbeat message to be stored by a receiving device to a persistent storage memory area;
- send, over the first network via the first network controller, one or more non-persistent heartbeat messages subsequent to the persistent heartbeat message, each non-persistent heartbeat message to be stored by the receiving device to a non-persistent storage memory area;
- monitor receipt of each of the one or more non-persistent heartbeat messages;
- periodically send the persistent heartbeat message in place of one of the one or more non-persistent heartbeat messages, wherein a period for sending corresponds to a first pre-determined time interval;
- detect a missed one of the one or more non-persistent heartbeat messages;
- based on the detection, increase frequency of sending persistent heartbeat messages instead of any non-persistent heartbeat messages for a second pre-determined time interval; and
- based on a determination that each expected persistent heartbeat message has been received for the second pre-determined time interval, decrease frequency of sending persistent heartbeat messages and return to sending the one or more non-persistent heartbeat messages.

8. The non-transitory computer readable medium of claim 7, wherein the first pre-determined time interval is based on a number of messages or a configurable time duration.

9. The non-transitory computer readable medium of claim 7, wherein the instructions to cause the one or more hardware processors to detect a missed one of the one or more non-persistent heartbeat messages comprise instructions to detect based upon a failure of delivery for a TCP transmission.

10. The non-transitory computer readable medium of claim 7, wherein the instructions to cause the one or more hardware processors to increase frequency comprise instructions to increase frequency of sending persistent heartbeat messages that are stored to persistent storage upon receipt.

11. The non-transitory computer readable medium of claim 7, wherein the instructions to cause the one or more hardware processors to decrease frequency comprise instructions to decrease frequency to a frequency equal to the first pre-determined time interval.

12. The non-transitory computer readable medium of claim 7, wherein the periodic heartbeat message comprises an aggregated heartbeat message containing information from more than one quorum actor on a single node.

13. A computer-implemented method for a quorum based distributed storage system comprising a plurality of quorum actors including a plurality of quorum members, and a quorum witness, the method comprising:
- obtaining, at a computing device, each of a plurality of heartbeat messages for processing as either a persistent heartbeat message or a non-persistent heartbeat message, each of the plurality of heartbeat messages indicating availability of a quorum actor within the quorum based distributed storage system;
- processing a first of the plurality of heartbeat messages as a persistent heartbeat message, in part, by making a first determination to store heartbeat information contained in a first instance to persistent storage upon receipt;
- monitoring receipt of second instances of the plurality of heartbeat messages;
- processing each of the second instances as a non-persistent heartbeat message by making a second determination to store information contained in the second instance to non-persistent storage upon receipt;
- for each of a select subset of fewer than all of the second instances, processing messages from the selected subset as a persistent heartbeat message;
- detecting a missed one of the plurality of non-persistent heartbeat messages;
- based on the detection, increasing frequency of processing received heartbeat messages as persistent heartbeat messages for a pre-determined period; and
- based on a determination that each expected heartbeat message has been received for the pre-determined period, decreasing frequency of processing heartbeat messages as persistent heartbeat messages by processing sets of heartbeat messages as non-persistent.

14. The computer-implemented method of claim 13, wherein the pre-determined period is based on a number of messages or a configurable time duration.

15. The computer-implemented method of claim 13, wherein detecting a missed one of the one or more non-persistent heartbeat messages is based upon detecting failure of delivery for a TCP transmission at a node initiating the heartbeat message.

16. The computer-implemented method of claim 13, wherein information provided in each one of the non-persistent heartbeat messages includes all information pertaining to state of a quorum member that is contained in a persistent type of heartbeat message.

17. The computer-implemented method of claim 13, further comprising storing information from a most recently received non-persistent heartbeat message to persistent storage responsive to detecting the missed one or more non-persistent heartbeat messages.

18. The computer-implemented method of claim 13, wherein increasing frequency comprises storing every received heartbeat message to persistent storage.

19. The computer-implemented method of claim 13, wherein decreasing frequency comprises returning to a frequency equal to prior to detecting the missed one or more non-persistent heartbeat messages.

20. The computer-implemented method of claim 13, wherein each of the plurality of heartbeat messages comprises an aggregated heartbeat message containing information from more than one quorum actor.

* * * * *